United States Patent
Schulz et al.

(10) Patent No.: US 10,710,100 B2
(45) Date of Patent: Jul. 14, 2020

(54) MASS-TRANSFER APPARATUS

(71) Applicant: JULIUS MONTZ GmbH, Hilden (DE)

(72) Inventors: Robin Schulz, Kamen (DE); Egon Zich, Leichlingen (DE); Helmut Jansen, Dormagen (NL); Thorsten Erik Alexander Hugen, Essen (DE)

(73) Assignee: JULIUS MONTZ GmbH, Hilden (DE)

( * ) Notice: Subject to any disclaimer, the term of this patent is extended or adjusted under 35 U.S.C. 154(b) by 108 days.

(21) Appl. No.: 16/106,713

(22) Filed: Aug. 21, 2018

(65) Prior Publication Data
US 2019/0060916 A1 Feb. 28, 2019

(30) Foreign Application Priority Data
Aug. 23, 2017 (DE) .................. 10 2017 007 861

(51) Int. Cl.
| | | |
|---|---|---|
| B04B 5/06 | (2006.01) | |
| B01J 19/18 | (2006.01) | |
| B01J 19/32 | (2006.01) | |
| B01D 3/30 | (2006.01) | |
| B01D 3/08 | (2006.01) | |
| B01D 3/26 | (2006.01) | |
| B01F 3/04 | (2006.01) | |

(Continued)

(52) U.S. Cl.
CPC ................. B04B 5/06 (2013.01); B01D 3/08 (2013.01); B01D 3/26 (2013.01); B01D 3/30 (2013.01); B01F 3/04617 (2013.01); B01F 7/00041 (2013.01); B01F 7/00241 (2013.01); B01J 19/1806 (2013.01); B01J 19/32 (2013.01); B01J 19/28 (2013.01); B01J 2219/3221 (2013.01)

(58) Field of Classification Search
CPC .... B01D 3/08; B01D 3/26; B01D 3/30; B01F 3/04617; B01F 7/00041; B01F 7/00241; B01J 19/1806; B01J 19/28; B01J 19/32; B01J 2219/3221; B04B 5/06
USPC ............................................. 261/84, 85, 88
See application file for complete search history.

(56) References Cited

U.S. PATENT DOCUMENTS 2,941,872 A * 6/1960 Pilo et al. ................. B04B 5/06
                                                    422/259
2,944,801 A * 7/1960 Katz et al. .............. F28D 19/04
                                                    261/24

(Continued)

FOREIGN PATENT DOCUMENTS

| EP | 2568 A1 | 6/1979 |
|---|---|---|
| EP | 0089128 A | 5/1986 |

(Continued)

*Primary Examiner* — Charles S Bushey

(57) ABSTRACT

An apparatus for mass transfer between a liquid and a gas inside a rotor having a packing. The liquid is introduced at a center of the rotor and driven outward through the packing by centrifugal force generated by rotation of the rotor, and the gas surrounding the rotor is forced inward through the rotor by a pressure of the gas, counter to the liquid flow in the rotor. The packing inside the rotor is divided into individual packing segments that together form a circular disk. Each circular ring segment is formed by at least one structured packing formed of a plurality of superimposed woven, knitted, mesh or lattice structured surfaces composed of metal, in particular sheet-metal strips, or plastic or glass fibers, to which the axis of rotation of the rotor runs perpendicular.

20 Claims, 3 Drawing Sheets

(51) Int. Cl.
*B01F 7/00* (2006.01)
*B01J 19/28* (2006.01)

(56) References Cited

U.S. PATENT DOCUMENTS

| | | | | |
|---|---|---|---|---|
| 3,095,149 | A * | 6/1963 | Peebles | B01D 1/20 |
| | | | | 239/224 |
| 3,701,513 | A * | 10/1972 | Carter | F02M 9/125 |
| | | | | 261/18.2 |
| 3,991,143 | A * | 11/1976 | Carter | F02M 17/16 |
| | | | | 261/18.2 |
| 4,283,255 | A | 8/1981 | Ramshaw | |
| 4,549,998 | A * | 10/1985 | Porter | B01D 11/0453 |
| | | | | 261/88 |
| 4,692,283 | A * | 9/1987 | Wem | B04B 7/18 |
| | | | | 261/89 |
| 4,731,159 | A * | 3/1988 | Porter | B01D 3/08 |
| | | | | 159/6.1 |
| 5,363,909 | A | 11/1994 | Acharya et al. | |
| 9,839,895 | B2 * | 12/2017 | Chen | B01F 7/163 |
| 9,987,589 | B2 | 6/2018 | Kotagiri | |
| 2017/0028311 | A1 | 2/2017 | Namdeo | |

FOREIGN PATENT DOCUMENTS

| | | |
|---|---|---|
| GB | 265120 A | 7/1927 |
| GB | 757149 A | 9/1956 |

* cited by examiner

MASS-TRANSFER APPARATUS

FIELD OF THE INVENTION

The present invention relates to a mass-transfer apparatus. More particularly this invention concerns an apparatus for transferring mass between a liquid and a gas.

BACKGROUND OF THE INVENTION

In a known apparatus for mass transfer between a liquid and a gas inside a rotor having a packing, the liquid is introduced at the center of the rotor and driven outward through the packing by the centrifugal force generated by rotation of the rotor, and the gas surrounding the rotor is forced inward through the rotor by the gas pressure, counter to the liquid flow in the rotor.

WO 2015/101826 (U.S. Pat. No. 9,987,589) and WO 2016/038480 (US 2017/0028311) disclose mass-transfer machines having a rotor that has two spaced disks, a packing that drives centrally delivered liquid outward as the rotor rotates in the space between the two faces. Here the rotor is surrounded by a gas that due to the gas pressure flows through the rotor counter to the liquid, in order to produce a mass transfer between the liquid and the gas.

OBJECTS OF THE INVENTION

It is therefore an object of the present invention to provide an improved mass-transfer apparatus.

Another object is the provision of such an improved mass-transfer apparatus that overcomes the above-given disadvantages, in particular in which the mass transfer and the transport of material are substantially improved and operating times are reduced. The apparatus should moreover be easy to manufacture, assemble and use.

SUMMARY OF THE INVENTION

An apparatus for mass transfer between a liquid and a gas inside a rotor having a packing and where
the liquid is introduced at a center of the rotor and driven outward through the packing by centrifugal force generated by rotation of the rotor, and
the gas surrounding the rotor is forced inward through the rotor by a pressure of the gas, counter to the liquid flow in the rotor,
the improvement wherein the packing inside the rotor is divided into individual packing segments that together form a circular disk, each circular ring segment is formed by at least one structured packing comprised of a plurality of superimposed woven, knitted, mesh or lattice structured surfaces composed of metal, in particular sheet-metal strips, or plastic or glass fibers, to which the axis of rotation of the rotor runs perpendicular.

Dividing the packing situated in the rotor into individual packing segments having a woven, knitted, mesh or lattice structure leads to a substantial improvement in the mass transfer and the transport with shorter operating times. The rotor is assembled from individual packing segments that in turn are assembled from separate structured surfaces, which makes the production process especially easy and moreover affords the advantage that in their structure and the types and dimensions of the structured surface the structured packings can be adapted very precisely to the particular requirements.

It is particularly advantageous here if the structured surfaces are undulating with the undulations of each structured surface lying parallel to one another. It has also proved advantageous both in terms of the effect and in terms of production if the undulations of the structured surface are of zigzag-shaped cross section. In addition, it is also proposed that the undulations of one structured surface be arranged at an angle, in particular at right angles, to the undulations of an adjacent structured surface, so that intersecting flow passages exist between two structured surfaces.

It is proposed that preferably the structured surfaces are composed of metal and/or plastic wires or sheet-metal strips or glass fibers. Here the metal and/or plastic wires may have a diameter of 0.1 to 0.5, preferably 0.15 to 0.2 mm.

It is advantageous if the structured packing situated in the rotor is assembled from 2 to 64, preferably 4 to 16 packing segments. In terms of design it is proposed that the inner ends of packing segments form an inner, cylindrical, coaxial annular space from which the flow passages extend and into which the liquid is delivered. It is also proposed for this purpose that the outer ends of the packing segments form an outer cylindrical ring, in which the flow passages of the packing segments terminate.

It has proved particularly advantageous if the packing segments are assembled from 3 to 10, preferably 5 to 8, superimposed structured surfaces. The structured surfaces of a packing segment may also be spot-welded to one another, in particular by means of laser beams.

The production of rotors of larger diameter is facilitated if the structured packing of the rotor comprises structured packing rings coaxial with one another, which are divided into individual circular ring segments. It is also proposed that the rotor comprise two circular spaced disks to which the axis of rotation of the rotor runs perpendicular and that form a space between them that is filled by the packing segments.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
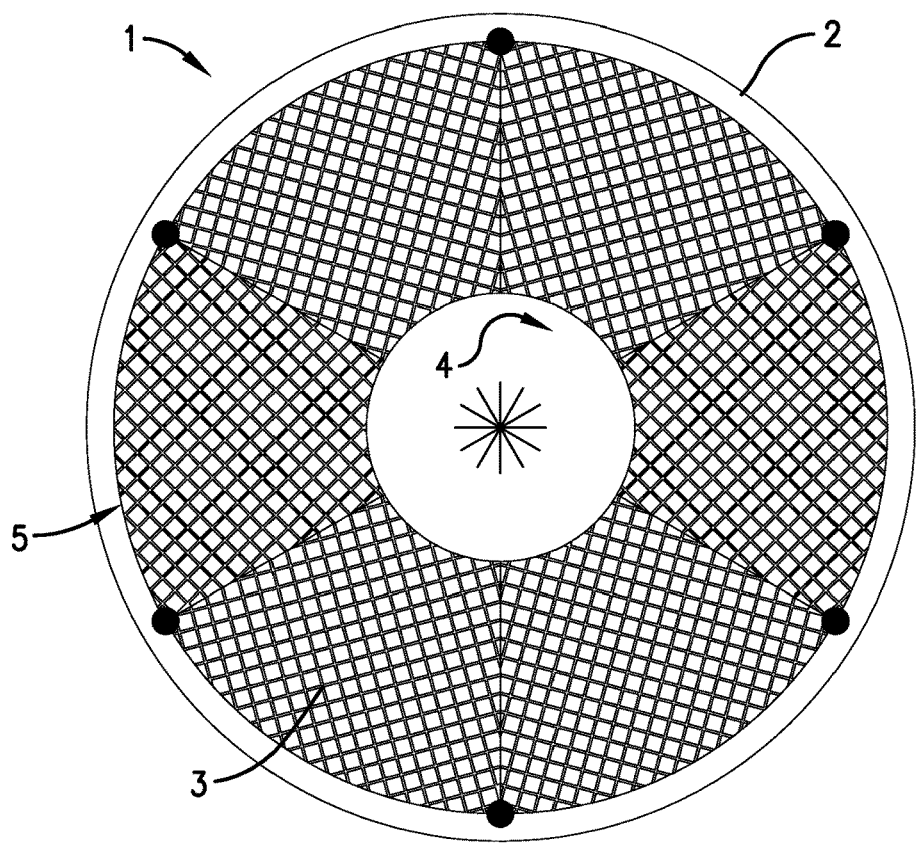
FIG. 1 is a section through the rotor of the mass-transfer apparatus according to the invention.

The mass-transfer apparatus according to the invention comprises a rotor 1 having two coaxial, circular spaced disks 2 that are parallel to one another and form a space filled by a packing. Here the packing comprises individual packing segments 3 in the form of circular ring segments, so that the inner ends of the packing segments 3 form an inner cylindrical, coaxial or cylindrical annular space 4 to which the liquid is supplied. The outer, curved ends of the packing segments form an outer cylindrical ring 5, in which flow passages 6 of the packing segments terminate.

Figure 2:
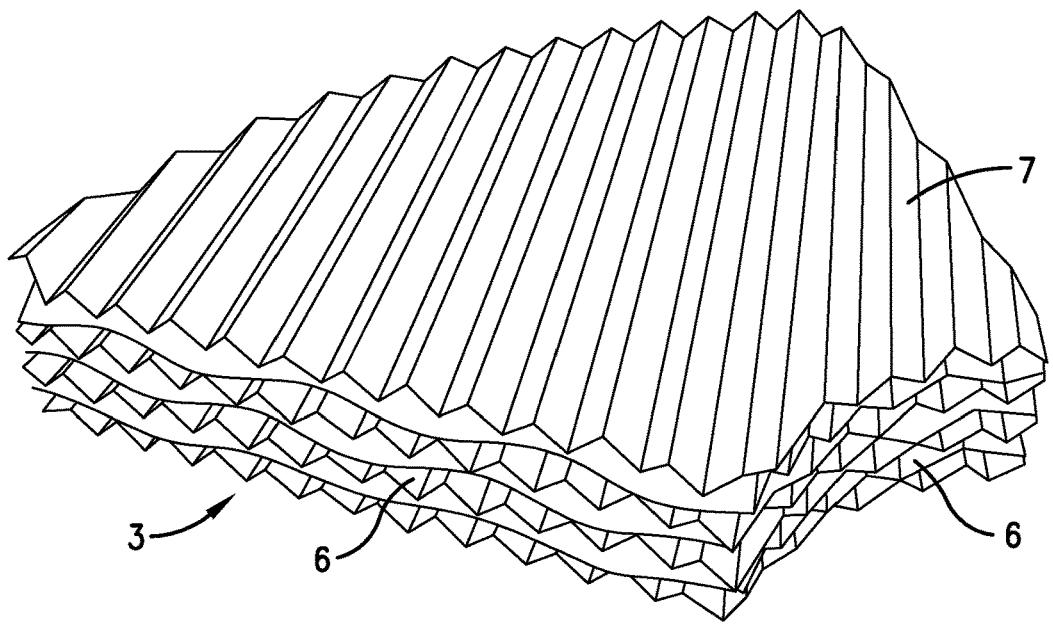
FIG. 2 is a large-scale perspective view of a packing segment assembled from structured surfaces.
Figure 3:
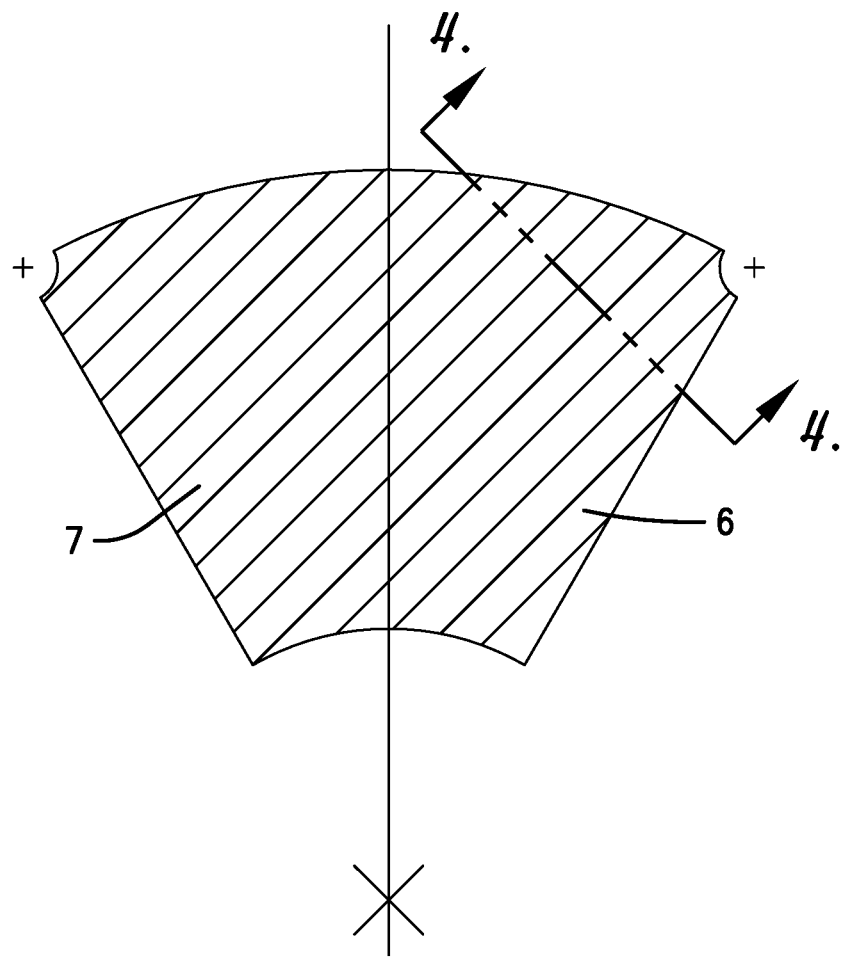
FIG. 3 is a top view of a structured surface.
Figure 4:
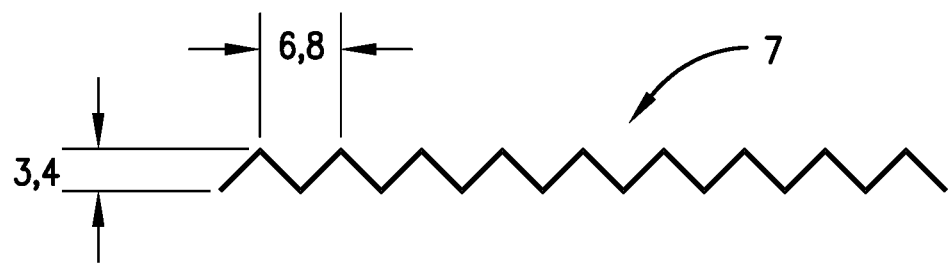
FIG. 4 is a schematic section according to line IV-IV of FIG. 3.

As shown in FIG. 2, each packing segment 3 is constructed from separate, superimposed structured surfaces 7 of undulating shape. Here the undulations may be designed in such a way that they are of zigzag-shaped cross section, as shown in FIG. 4, or they may consist of rounded undulations.

The parallel undulations of each structured surface 7 form valleys in turn forming the flow passages 6, contiguous structured surfaces being twisted relative to one another and thereby extend at an angle, in particular at a right angle to one another, in such a way that the flow passages intersect one another between two structured surfaces, as can be seen from FIG. 2.

The packing segments are each assembled from 3 to 150 preferably 5 to 25, superimposed structured surfaces 7. Furthermore, the structured packing in the rotor is assembled from 2 to 64 packing segments, as shown in FIG. 1.

Figure 5:
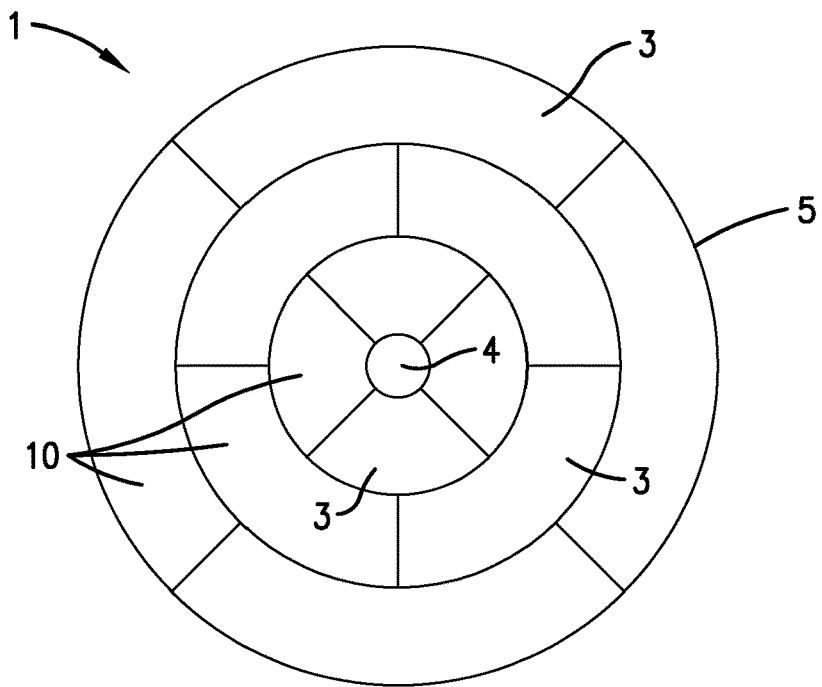
FIGS. 5 and 6 are sections through rotors having structured packing rings composed of individual circular ring segments.
Figure 6:
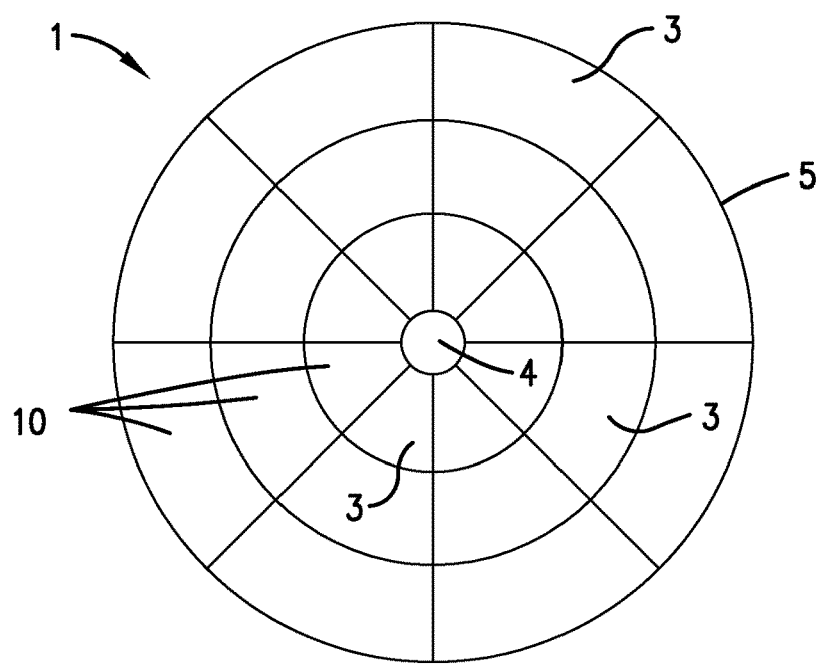

Alternatively, however, the structured packing of the rotor 1 may also comprise coaxial structured packing rings 10 that in turn are divided into individual circular ring segments 3, as shown in FIGS. 5 and 6.

The structured surfaces 7 are composed either of a strip, woven fabric or knitted fabric of solid metal and/or plastic wires or glass fibers, the wires or fibers preferably having a diameter of 0.1 to 0.5 mm, preferably 0.15 to 0.2 mm. Alternatively, however, the structured surfaces 7 may also be formed from a metal or plastic mesh or lattice.

The structured surfaces 7 of a packing segment 3 are preferably spot-welded to one another by laser beams.

We claim:

1. An apparatus for mass transfer between a liquid and a gas inside a rotor having a packing and where
   the liquid is introduced at a center of the rotor and driven outward through the packing by centrifugal force generated by rotation of the rotor, and
   the gas surrounding the rotor is forced inward through the rotor by a pressure of the gas, counter to the liquid flow in the rotor,
   wherein the packing inside the rotor is divided into individual packing segments that together form a circular disk, each individual packing segment being formed by at least one structured packing comprised of a plurality of superimposed woven, knitted, mesh or lattice structured surfaces composed of metal, or plastic or glass fibers, to which the axis of rotation of the rotor runs perpendicular.

2. The apparatus defined in claim 1, wherein the structured surfaces are undulating with the undulations of each structured surface lying parallel to one another.

3. The apparatus defined in claim 2, wherein the undulations of the structured surface are of zigzag-shaped cross section.

4. The apparatus defined in claim 2, wherein the undulations of one structured surface extend at an angle to the undulations of an adjacent structured surface, so that intersecting flow passages exist between two structured surfaces.

5. The apparatus defined in claim 1, wherein the structured surfaces are composed of metal and/or plastic wires or sheet-metal strips or glass fibers.

6. The apparatus defined in claim 5, wherein the metal and/or plastic wires have a diameter of 0.1 to 0.5 mm.

7. The apparatus defined in claim 1, wherein the structured packing in the rotor is assembled from 2 to 64 packing segments.

8. The apparatus defined in claim 1, the inner ends of the packing segments form an inner cylindrical, coaxial annular space from which the flow passages proceed and into which the liquid is supplied.

9. The apparatus defined in claim 1, wherein outer ends of the packing segments form an outer cylindrical ring at which the flow passages of the packing segments terminate.

10. The apparatus defined in claim 1, wherein the packing segments are assembled from three to one hundred and fifty, superimposed structured surfaces.

11. The apparatus defined in claim 1, wherein the structured surfaces of a packing segment are spot-welded to one another.

12. The apparatus defined in claim 1, wherein the structured packing of the rotor comprises structured packing rings coaxial with one another that are divided into individual circular ring segments.

13. The apparatus defined in claim 1, wherein the rotor comprises two circular spaced disks to which an axis of rotation of the rotor runs perpendicular and that form a space between them that is filled by the packing segments.

14. An apparatus for mass transfer between a liquid and a gas inside a rotor comprising two circular spaced disks to which an axis of rotation of the rotor runs perpendicular and that form a space between them that is filled by a packing and where
    the liquid is introduced at a center of the rotor and driven outward through the packing by centrifugal force generated by rotation of the rotor, and
    the gas surrounding the rotor is forced inward through the rotor by a pressure of the gas, counter to the liquid flow in the rotor,
    wherein the packing inside the rotor is divided into individual packing segments that together form a circular disk, each individual packing segment being formed by at least one structured packing comprised of a plurality of superimposed woven, knitted, mesh or lattice structured surfaces composed of metal, or plastic or glass fibers, to which the axis of rotation of the rotor runs perpendicular.

15. The apparatus defined in claim 14, wherein the structured surfaces are undulating with the undulations of each structured surface lying parallel to one another and wherein the undulations of one structured surface extend at an angle to the undulations of an adjacent structured surface, so that intersecting flow passages exist between two structured surfaces.

16. The apparatus defined in claim 15, wherein the inner ends of the packing segments form an inner cylindrical, coaxial annular space from which the flow passages proceed and into which the liquid is supplied and wherein outer ends of the packing segments form an outer cylindrical ring at which the flow passages of the packing segments terminate.

17. An apparatus for mass transfer between a liquid and a gas inside a rotor comprising two circular spaced disks to which an axis of rotation of the rotor runs perpendicular and that form a space between them that is filled by a packing and where
    the liquid is introduced at a center of the rotor and driven outward through the packing by centrifugal force generated by rotation of the rotor, and
    the gas surrounding the rotor is forced inward through the rotor by a pressure of the gas, counter to the liquid flow in the rotor,
    wherein the packing inside the rotor is divided into individual packing segments that together form a circular disk, each individual packing segment being formed by at least one structured packing comprised of a plurality of superimposed woven, knitted, mesh or lattice structured surfaces composed of metal, or plastic or glass fibers, to which the axis of rotation of the rotor runs perpendicular, wherein the structured packing comprises structured packing rings coaxial with one another that are divided into individual circular ring segments.

18. The apparatus defined in claim 17, wherein the structured surfaces are undulating with the undulations of each structured surface lying parallel to one another and wherein the undulations of one structured surface extend at an angle to the undulations of an adjacent structured surface, so that intersecting flow passages exist between two structured surfaces.

19. The apparatus defined in claim 18, wherein the inner ends of the packing segments form an inner cylindrical, coaxial annular space from which the flow passages proceed and into which the liquid is supplied and wherein outer ends of the packing segments form an outer cylindrical ring at which the flow passages of the packing segments terminate.

20. The apparatus defined in claim 19, wherein the packing segments are assembled from five to twenty-five superimposed structured surfaces.

* * * * *